US008443407B2

(12) United States Patent
Gaede et al.

(10) Patent No.: US 8,443,407 B2
(45) Date of Patent: May 14, 2013

(54) FACILITATING PLACESHIFTING USING MATRIX CODE

(75) Inventors: Jason Gaede, Denver, CO (US);
Germar Schaefer, Monument, CO (US)

(73) Assignee: EchoStar Technologies L.L.C.,
Englewood, CO (US)

( * ) Notice: Subject to any disclaimer, the term of this patent is extended or adjusted under 35 U.S.C. 154(b) by 265 days.

(21) Appl. No.: 13/037,333

(22) Filed: Feb. 28, 2011

(65) Prior Publication Data

US 2012/0222071 A1     Aug. 30, 2012

(51) Int. Cl.
*H04N 7/173*     (2011.01)
*H04N 7/18*     (2006.01)
*G06F 3/00*     (2006.01)

(52) U.S. Cl.
USPC ............ 725/88; 725/38; 725/40; 725/78; 725/81; 725/86; 725/87; 725/100; 725/102; 725/109; 725/92; 725/93; 725/96; 725/80

(58) Field of Classification Search ............. 725/38–40, 725/78, 86–88, 100, 102, 109
See application file for complete search history.

(56) References Cited

U.S. PATENT DOCUMENTS

| | | | |
|---|---|---|---|
| 4,809,325 A | 2/1989 | Hayashi et al. |
| 4,837,414 A | 6/1989 | Edamula |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,959,285 A | 9/1999 | Schuessler |
| 5,978,855 A | 11/1999 | Metz et al. |
| 6,006,990 A | 12/1999 | Ye et al. |
| 6,058,238 A | 5/2000 | Ng |
| 6,512,919 B2 | 1/2003 | Ogasawara |
| 6,556,273 B1 | 4/2003 | Wheeler et al. |
| 6,983,304 B2 | 1/2006 | Sato |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,328,848 B2 | 2/2008 | Xia et al. |
| 7,369,180 B2 | 5/2008 | Xing |
| 7,387,250 B2 | 6/2008 | Muni |
| 7,394,519 B1 | 7/2008 | Mossman et al. |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

Byford, D., "Universal Interactive Device," International Business Machines Corporation, Jun. 1998, 1 page.

(Continued)

*Primary Examiner* — Jun Fei Zhong
(74) *Attorney, Agent, or Firm* — Kilpatrick Townsend & Stockton LLP

(57) ABSTRACT

A method for providing a user of a target device with placeshifted content. The method includes detecting, utilizing the target device, a matrix code associated with an audio/visual program. Data encoded in the matrix code includes program identifying information and elapsed time information with respect to the program. The method further includes generating, utilizing the target device, a request for the program based at least in part on the encoded data. The method also includes transmitting, utilizing the target device, the program request across a network.

10 Claims, 4 Drawing Sheets

U.S. PATENT DOCUMENTS

| | | |
|---|---|---|
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 2001/0037297 A1 | 11/2001 | McNair |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0125301 A1 | 6/2005 | Muni |
| 2005/0262548 A1 | 11/2005 | Shimojo et al. |
| 2005/0264694 A1 | 12/2005 | Ilan et al. |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Gerard Kindberg |
| 2009/0031071 A1 | 1/2009 | Chiu |
| 2009/0031373 A1 | 1/2009 | Hogyoku |
| 2009/0083808 A1 | 3/2009 | Morrison |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0327060 A1 | 12/2010 | Moran et al. |
| 2011/0039573 A1 | 2/2011 | Hardie |
| 2011/0065451 A1 | 3/2011 | Danado et al. |
| 2011/0208710 A1 | 8/2011 | Lesavich |
| 2011/0264527 A1 | 10/2011 | Fitzpatrick et al. |
| 2011/0282727 A1 | 11/2011 | Phan et al. |
| 2011/0314485 A1 | 12/2011 | Abed |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222081 A1 | 8/2012 | Schaefer et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 325 765 A | 12/1998 |
| GB | 2 471 567 A | 1/2011 |
| JP | 2007-213548 A | 8/2007 |
| JP | 2008 244556 A | 10/2008 |

| | | | |
|---|---|---|---|
| KR | 2004 0087776 A | 10/2004 | |
| WO | 95/27275 A1 | 10/1995 | |
| WO | 97/41690 A1 | 11/1997 | |
| WO | 01/06593 A2 | 1/2001 | |
| WO | 01/18589 A1 | 3/2001 | |
| WO | 01/58146 A2 | 8/2001 | |
| WO | 2005/109338 A1 | 11/2005 | |
| WO | 2007/009005 A1 | 1/2007 | |
| WO | 2009/057651 | 5/2009 | |
| WO | 2009/144536 A1 | 12/2009 | |
| WO | 2011/009055 A2 | 1/2011 | |

OTHER PUBLICATIONS

International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
Extended European Search Report for EP 12152690.9 dated Jun. 19, 2012, 9 pages.
International Search Report and Written Opinion of PCT/US2012/026624 mailed Aug. 29, 2012, 14 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 12/984,385, filed Jan. 4, 2011, Notice of Allowance mailed Nov. 28, 2012, 11 pages.
U.S. Appl. No. 13/037,312, filed Feb. 28, 2011, Office Action mailed Aug. 15, 2012, 9 pages.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.
"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.
"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local—QR Barcode Technology, 2 pp. Found online at http://www.searchmagnetlocal.com/qr_barcode_technology.html, Oct. 22, 2010.
Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y., "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=bisln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

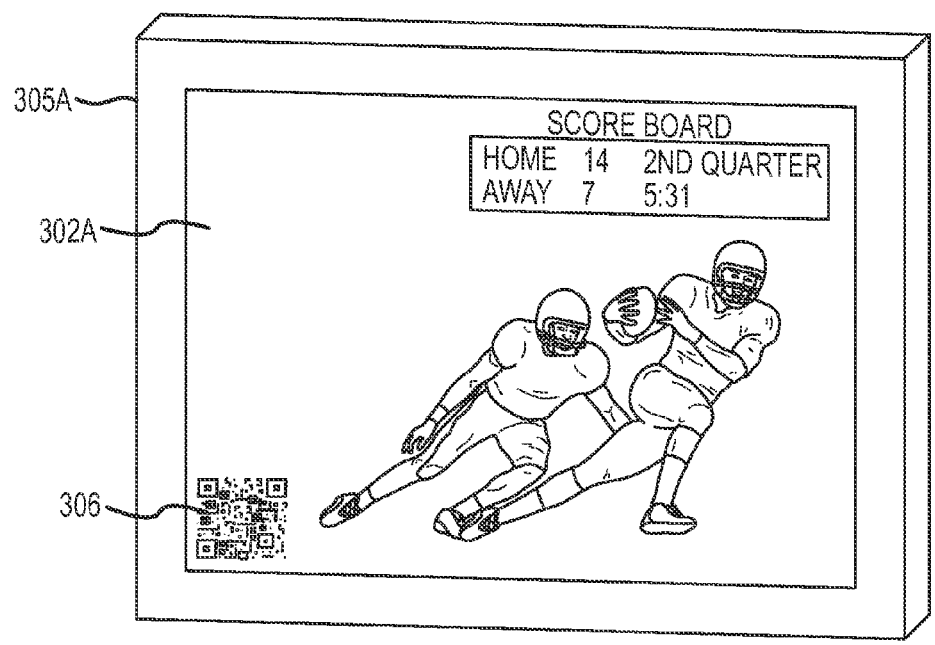
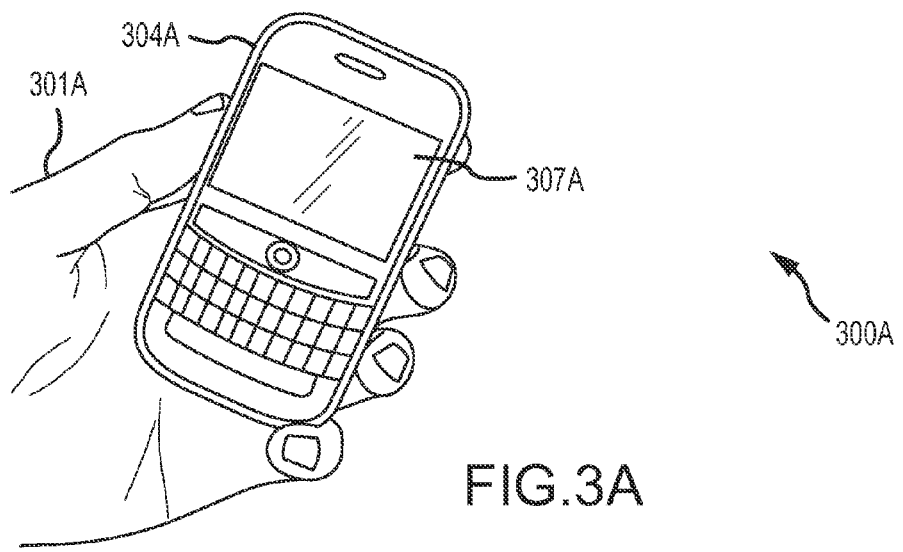
FIG.3A

FACILITATING PLACESHIFTING USING MATRIX CODE

FIELD OF THE INVENTION

The present disclosure relates to systems and methods for facilitating placeshifting transmissions and more particularly to systems and method for facilitating placeshifting transmissions to users of a target device using matrix code.

SUMMARY

In one embodiment, the present disclosure relates to a method for providing a user of a target device with place-shifted content. The method includes detecting, utilizing the target device, a matrix code. The matrix code is associated with an audio/visual program. Data encoded in the matrix code includes program identifying information and elapsed time information with respect to the program. The method further includes generating, utilizing the target device, a request for the program based at least in part on the encoded data. The method also includes transmitting, utilizing the target device, the program request across a network.

In one embodiment, the present disclosure relates to a system for transmitting placeshifted content. The system includes a content receiver, a target device, and a placeshifting device. The content receiver includes a first processing unit provided with computer implemented instructions to: receive a content stream from a service provider and transmit the content stream to a presentation device for display to a user; generate, based at least in part on the content stream and/or data associated with the content stream, a matrix code; and transmit the matrix code to the presentation device for display to the user. The target device is communicably coupled to a network and includes an optical input device configured to optically detect the matrix code, and a second processing unit communicably coupled to the optical input device. The second processing unit is provided with computer implemented instructions to: decode the matrix code; and generate, based at least in part on the decoded matrix code, a request for a content stream previously transmitted from the service provider to the content receiver. The placeshifting device is communicably coupled to the network and includes a third processing unit. The third processing unit is provided with computer implemented instructions to: receive across the network the target device's request for a content stream; and based at least in part on the request, retrieve from a storage device a content stream for transmission over the network to the target device.

In one embodiment, the present disclosure relates to a target device in a placeshifting system. The target device includes a network connection, an optical input device configured to optically detect a matrix code; and a processing unit connected to the network connection and configured to send and receive transactions across a network though the network connection. The processing unit is communicably coupled to the optical input device and is provided with computer implemented instructions to: decode the matrix code; generate, based at least in part on the decoded matrix code, a request for a content stream corresponding to the program; and process the content stream corresponding to the program received from across the network from a placeshifting source. The matrix code comprises at least program identifying information and elapsed time information with respect to the program.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 3A-3B are diagrams illustrating an example system for providing a user of a target device with placeshifted content utilizing matrix code. The system may be the system of FIG. 1.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

The present disclosure relates to systems and methods for facilitating placeshifting transmissions and more particularly to systems and method for facilitating placeshifting transmissions to users of a target device using matrix code.

Placeshifting technology is generally available today that allows a user to view content on a target device that would otherwise only be available at a placeshifting source, such as a receiver. Through placeshifting technology that is integrated into the receiver or is implemented in a stand-alone device, content can be shifted across a network to be viewed on a target device that is located remotely from the receiver. The shifted content may include programs or other content that is received at the receiver from a service provider, such as a satellite or cable television provider. The receiver may also shift recorded programs across the network to be viewed at the target device.

Often times, users viewing a particular program or other audio/visual content may be interrupted or otherwise required to leave the program prior to its completion. In such circumstances, users having access to placeshifting and recording technology can access, from a remote location, the partially viewed programs across the network for viewing at a target device. However, employing current placeshifting and recording technologies, to carry out such an operation, users must first program the receiver to record the program, and subsequently, from the remote location, enter a series of commands via a user interface of the target device to select the desired program. Moreover, to view the program at the target device from the point where the user concluded his partial viewing, users are required to enter a series of additional commands via the user interface (e.g., fast forward/backward). The present disclosure relates to systems and methods that utilize matrix codes to provide users having access to placeshifting and recording technology with convenient access to partially viewed programs or other audio/visual content at the point in the program that the user concluded his partial viewing.

Figure 1:
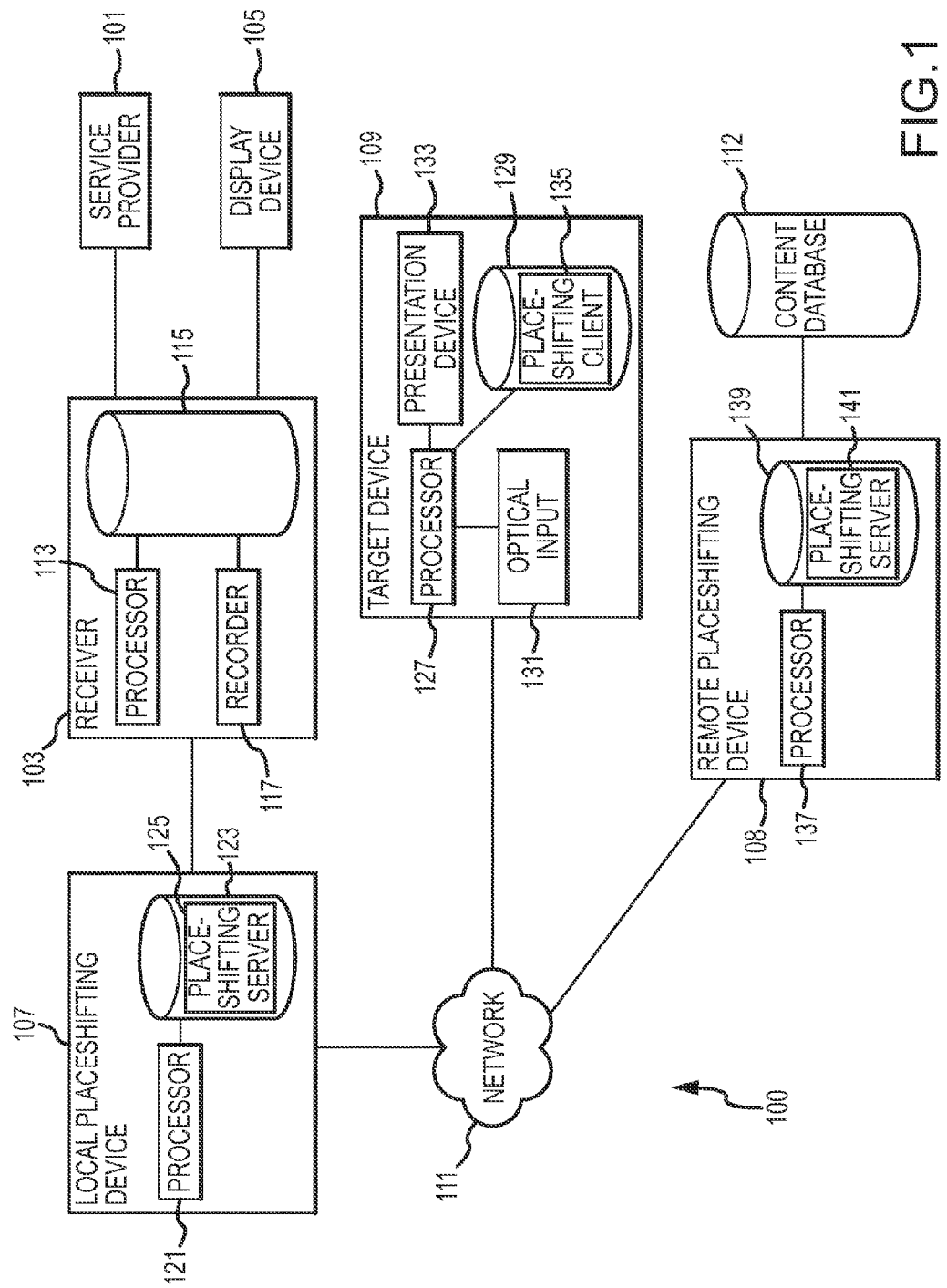
FIG. 1 is a block diagram illustrating a system for receiving and displaying content from one or more placeshifting sources at a target device using matrix code in accordance with some embodiments of the present disclosure.

FIG. 1 is a schematic illustration of a general operating environment 100 showing components and features of embodiments discussed herein. Generally, embodiments discussed herein are directed to receiving and displaying content from one or more placeshifting sources at a target device using matrix code. In some embodiments, the operating environment 100 may include a service provider 101, a content receiver 103, a display device 105, a local placeshifting device 107, and a target device 109. The local placeshifting device 107 may be in communication with the target device 109 over a network 111. The operating environment may further include a remote placeshifting device 108 and a content database 112, which may be in communication with the target device 109 over the network 111.

In illustrative embodiments, the service provider 101 may be any service provider that provides an audio/visual content transmission to the receiver 103 such as, without limitation, a satellite television service, a direct television service or cable television service, or a streaming video delivered across a network such as the Internet.

In various embodiments, the content receiver 103 may represent a first placeshifting source. As used herein, "placeshifting" may refer to an action of a placeshifting source that transfers content which would otherwise be viewed locally at, for example, a user's residence, across a network to be viewed at a remote device such as a mobile electronic device. Generally, the content receiver 103 may be any device capable of receiving video and/or audio content included in a broadcast or other content service transmission from a service provider. For example, the content receiver 103 may be configured to communicate with or receive signals from the service provider 101, which may broadcast, transmit, or otherwise deliver a content service to the content receiver 103. The content receiver 103 may be in the form of, for example, a set-top box, a digital video recorder, a cable receiver, a general purpose computing device, or combinations thereof. The content receiver 103 may also include a cable modem that receives streaming video and/or audio.

In some embodiments, the content receiver 103 may be associated with an individual, business or other entity, user, or subscriber that receives a content service transmission from the service provider 101. Generally the terms "user" and/or "subscriber" refer to individuals or companies that receive the content service transmission. This may include individuals or companies that have purchased a subscription to the content service transmission. Alternatively or additionally, the terms "user" and/or "subscriber" may refer to individuals who have been given access to the content service transmission through promotional offers and/or other non-fee-based agreements. As will be discussed in further detail below, the target device 109 may also be associated with the user or subscriber.

In illustrative embodiments, the content receiver 103 may include one or more processing units 113, one or more one or more non-transitory storage media 115, and a recorder 117.

In some embodiments, the processing unit 113 of the content receiver 103 may be operable to execute instructions stored in the non-transitory storage medium 115 in connection with various functions associated with the receiver 103. For example, the processing unit 113 may display graphics, images, animations and/or other audio/visual content on an integrated display device or the display device 105. Additionally, the processing unit 113 may derive information related to operation of the content receiver 103 and dynamically generate one or more matrix codes that include at least a portion of the derived information, and transmit the dynamically generated matrix code to an integrated display device or a display device 105, such as a television, for display to a user. For example, the matrix codes may be overlaid on or otherwise combined with the audio/visual content provided by the service provider 101.

In some embodiments, the processing unit 113 may dynamically generate the matrix codes for display to a user in response to receiving a user input. For example, a user may utilize a user interface of the content receiver 103 to initiate the generation of a matrix code. Additionally, or alternatively, the processing unit 113 may periodically generate the matrix codes for display to users. As will be discussed in more detail below, the matrix codes generated by the processing unit 113 may be captured by a device with optical reading capabilities such as the target device 109, to facilitate viewing at the target device content which would otherwise be viewed locally at the display device 105. While the present disclosure is described with respect to embodiments in which the matrix codes are generated by the content receiver 103, it is to be appreciated that the matrix codes could be generated by other system devices such as the local placeshifting device 107, and/or be provided in the audio/visual content received from the service provider 101.

In some embodiments, the matrix codes generated by the processing unit 113 may include QR codes. Generally, a "QR code" may refer to a matrix barcode that is readable by scanners, mobile phones, or other electronic device with optical capabilities, which employs geometrical black and white patterns to encode information. The information encoded in the QR code may be referred to herein as "code data."

In various embodiments, the code data may relate to operation of the content receiver 103. For example, the code data may include identifiers (such as network addresses, serial numbers, and/or media access control numbers), configuration information (such as the individual hardware components included in the content receiver 103 and/or identifiers for such components, drivers utilized on the content receiver 103, options set for the content receiver 103), account information for one or more user or subscriber accounts (such as subscription service accounts) associated with the content receiver 103, and/or a location of the content receiver 103 (such as a global positioning system location and/or a mailing address). For instance, in implementations where the content receiver 103 includes a television receiver, the code data may include a serial number for the receiver, a media access control number for the receiver, current settings for the receiver, account information for a programming subscription related to the television receiver, information on hardware included in the television receiver, a mailing address associated with the television receiver and/or other information relating to the receiver 103.

In illustrative embodiments, the code data may also include information regarding the audio/visual content being transmitted to the display device 105 from the content receiver 103 (e.g., a television or movie program being viewed by a user). For example, in embodiments in which the audio/visual content is a television or movie program, the code data may include any or all of: program identifying information, channel identifying information, storage location information, date/time information, elapsed time information (e.g., how far into the program a user is), and/or other information relating to the program. In some embodiments, at least a portion of the foregoing information may be provided to the receiver 103 through a metadata stream associated with the audio/visual content stream received from the service provider 101. As will be discussed in further detail below, the code data may be utilized by the target device 109 to receive placeshifting transmissions relating to the audio/visual content which was being displayed on the display device 105 at the time, or just prior to the time, the matrix code was generated and displayed. For example, the code data may be utilized by the target device 109 to make available at the target device 109 the program from a particular point in the program such as the beginning of the program, the point in the program at which the matrix code was generated and displayed, or any other point in the program desired by a user. It is to be appreciated that the audio/visual content being viewed by a user on the display device 105 may be content that is being transmitted by the service provider 101 or content that has been previously stored to the storage medium 115 of the content receiver 103, such as though operation of the recorder 117.

In some embodiments, the content receiver 103 may include or be associated with a recorder 117, such as a digital video recorder. The recorder 117 may be integrated into the receiver 103 or may be a stand alone device. The recorder 117 may be operated by a user who programs the receiver 103 to record a particular program at a specified time. When the program occurs, the recorder 117 will record and store the program, which can then be viewed later. In addition to this functionality, the recorder 117 may buffer a certain amount of content during a live transmission. Buffering a live transmission allows a user to pause and/or rewind the content of the transmission and to then display the content in a non-live or delayed manner. Additionally, the recorder 117 may be configured to automatically record and store programs for which a user has requested that a matrix code be generated and/or programs for which a matrix code was captured by a user. In this manner, the programs of interest to users may be available for placeshifting transmissions.

The receiver 103 may also include or be associated with a memory or other storage device 115, such as magnetic or optical storage. The storage device 115 may be volatile or non-volatile memory implemented using any suitable technique or technology such as random access memory (RAM), disk storage, flash memory, solid state and/or other suitable storage medium. The storage device 115 may be located within the receiver 103 or separately from the receiver 103.

In some embodiments, the display device 105 may be any kind of display device such as a cathode ray tube display, a liquid crystal display, a television, a computer monitor, or other electronic display device.

In illustrative embodiments, the local placeshifting device 107 may include one or more processing units 121 and one or more non-transitory storage media 123. The processing units 121 may be operable to execute instructions stored in the non-transitory storage media 123 in connection with various functions associated with the local placeshifting device 107. The storage media 123 may take the form of, without limitation: a magnetic storage medium; optical storage medium; magneto-optical storage medium; read only memory; random access memory; erasable programmable memory; flash memory; or other suitable storage medium.

In various embodiments, the storage media 123 may include a placeshifting server 125, which may be configured to be executed by the processing unit 121. Generally, the placeshifting server 125 may be operable to transfer content across the network 111 to the target device 109. Network transactions may be conducted through the operation of a network interface, such as a modem network interface card or cable plug or jack. It should be appreciated that the network 111 may be any type of network capable of data communication, such as a local or wide area network or the Internet.

In illustrative embodiments, the placeshifting server 125 may transfer audio/visual programs or other content, such as television or movie programs received by the receiver 103 from the service provider 101. The placeshifted content may include both live transmissions from the service provider 101 and transmissions that have been stored to the storage device 115 of the receiver 103. The local placeshifting device 107 may be in communication with the receiver 103 through, for example, a S-video connection, an HDMI connection, or other suitable wired or wireless connection. While the foregoing has been described with respect to embodiments in which the local placeshifting device 107 is provided as a standalone device, it is to be appreciated that the placeshifting device 107 and its components may be integrated into the content receiver 103.

In embodiments in which the local placeshifting device 107 delivers placeshifted content to a remote network end point, the quality of such delivery (e.g., transmission rate, reliability) is dependent on the quality of the network interface available at the physical location of the content receiver 103. For example, if only a "dial-up" network connection is available for delivering placeshifted content across the network 111, the available bandwidth may be insufficient to transmit the placeshifted content to the target device 109 at a rate which is suitable to users. Therefore, it may be desirable to optionally deliver placeshifted content to the target device 109 independent of the network interface available at the physical location of the content receiver 103. In this regard, in some embodiments, the system may further include a remote placeshifting device 108 connected to the network 111 that may function as a second placeshifting source.

In illustrative embodiments, the remote placeshifting device 108 may include one or more processing units 137 and one or more non-transitory storage media 139. The processing unit 137 may be operable to execute instructions stored in the non-transitory storage media 139 in connection with various functions associated with the remote placeshifting device 108. The storage media 139 may take the form of, without limitation: a magnetic storage medium; optical storage medium; magneto-optical storage medium; read only memory; random access memory; erasable programmable memory; flash memory; and/or other suitable storage medium. While the present disclosure is described herein with respect to tasks or functions performed by a single remote placeshifting device 108, it is to be appreciated that any number of computing devices, alone or in combination, independent and/or remote from remote placeshifting device 108, could be used to perform the tasks or functions of the remote placeshifting device 108, or portions thereof.

In various embodiments, the storage media 139 may include a placeshifting server 141, which may be configured to be executed by the processing unit 137. As with the placeshifting server 125, the placeshifting server 141 may be operable to transfer content across the network 111 to the target device 109. Network transactions may be conducted through a reliable, high-speed network interface, such as a broadband connection.

In illustrative embodiments, the remote placeshifting device 108 may be in communication with a content database 112. Generally, the content database 112 may include audio/visual content, such as television and/or movie programs. For example, the content database 112 may include any or all of the audio/visual content which has been transmitted to users by the service provider 101. In this manner, any or all of the audio/visual content which could be stored on the content receiver 103 may also be available for retrieval at the content database 112.

In some embodiments, either or both of the placeshifting server 125 and the placeshifting server 141 may communicate with the target device 109 over the network 111 to placeshift display of content from the receiver 103 to the target device 109. The placeshifting servers 125 and 141 may shift display of content to the target device 109 in order to allow a user to view and/or hear content at a location that is remote from the location of the receiver 103.

In some embodiments, the target device 109 may be in the form of a mobile electronic device such as a cellular phone, smart phone, personal digital assistant, tablet device, or laptop computer. Alternatively, the target device 109 may be a stationary device, such as a desktop computer. The target device 109 may include one or more processing units 127, one or more non-transitory storage media 129, an optical reading device 131, and one or more presentation devices 133 (such as a display screen, a speaker, and/or other suitable presentation component).

In various embodiments, the processing unit 127 may direct the overall operation of the target device 109. A computer program or set of instructions may be coded or otherwise implemented on the processing unit 127 to enable the processing unit 127 to carry out the device operation. As will be described in more detail below, the processing unit 127 may also retrieve and/or process information from the optical reading device 131.

In illustrative embodiments, the storage media 129 may interface with the processing unit 127 and may store program code and provide storage space for data useful in executing the program code and carrying out device functions. The storage media 129 may take the form of, without limitation: a magnetic storage medium; optical storage medium; magneto-optical storage medium; read only memory; random access memory; erasable programmable memory; flash memory; and/or other suitable storage medium). The features and functionality of the target device 109 may be implemented using hardware, software or a combination of hardware and software. If implemented as software, the software may run on the processing unit 127 or be stored in the storage media 129.

In illustrative embodiments, the storage media 129 may include a placeshifting client 135. The placeshifting client 135 may be configured to transmit requests for content input streams from either or both of the placeshifting servers 125, 141. As previously discussed, the placeshifting servers 125, 141 may be in communication with one or more placeshifting sources such as the content receiver 103 or the content database 112 to access and transmit the requested content input stream to the placeshifting client. Upon receipt of the content input stream from the placeshifting servers 125, 141, the placeshifting client 135 may output the received content to the display device 133 of the target device 109.

In some embodiments, requests for content input streams, or placeshifting requests, may be input by users via an appropriate command entered through a user interface of the target device 109. The commands may include, for example, a user making a selection that corresponds to a previously captured matrix code. Upon such selection, the placeshifting client 135 may access the relevant code data, and transmit the placeshifting request based at least in part on the code data.

In illustrative embodiments, the placeshifting client 135 may be configured to determine whether to transmit the placeshifting request to the placeshifting server 125 or the placeshifting server 141 based on the network interface available to the placeshifting servers 125, 141. Such determination may be based, for example, at least in part on the availability and/or quality of the network interface. Additionally, or alternatively, users may manually select to which of the placeshifting servers 125, 141 a placeshifting request is transmitted.

In various embodiments, the target device 109 may connect to the network 111 through a router or gateway, which provides a communication pathway between network end-points on a local network, and provides a communication pathway for the network end-points to reach globally addressable end-points on a larger network 111, such as the Internet. The router or gateway may be associated with a local area network (LAN), wide area network (WAN), Wi-Fi network, and/or other suitable communication network. The router or gateway may determine the IP address or other network address used by the target device to connect to the network 111. The target device 109 may additionally include other local-network-specific details or parameters that are used to connect with the target device 109 when it is provided on the local network. Such network-specific parameters may include, for example, connection mechanisms and/or network passwords.

In various embodiments, the target device 109 may include an optical reading device 131 such as, for example, a camera, a laser scanner, or other digital recording device. The optical reading device 131 may be integrated into the target device 109 or provided as a separate component in communication with the target device 109. The optical reading device 131 may be configured to detect and/or record a machine readable code, such as a matrix code, which has been made available to a user of the target device 109.

In some embodiments, the processing unit 127 may be configured such that upon capture of a matrix code, via the optical reading device 131, the processing unit 127 decodes the matrix code to obtain the code data embedded therein. Additionally, the processing unit 127 may be configured to store the code data to the storage media 129 for subsequent retrieval.

Figure 2:
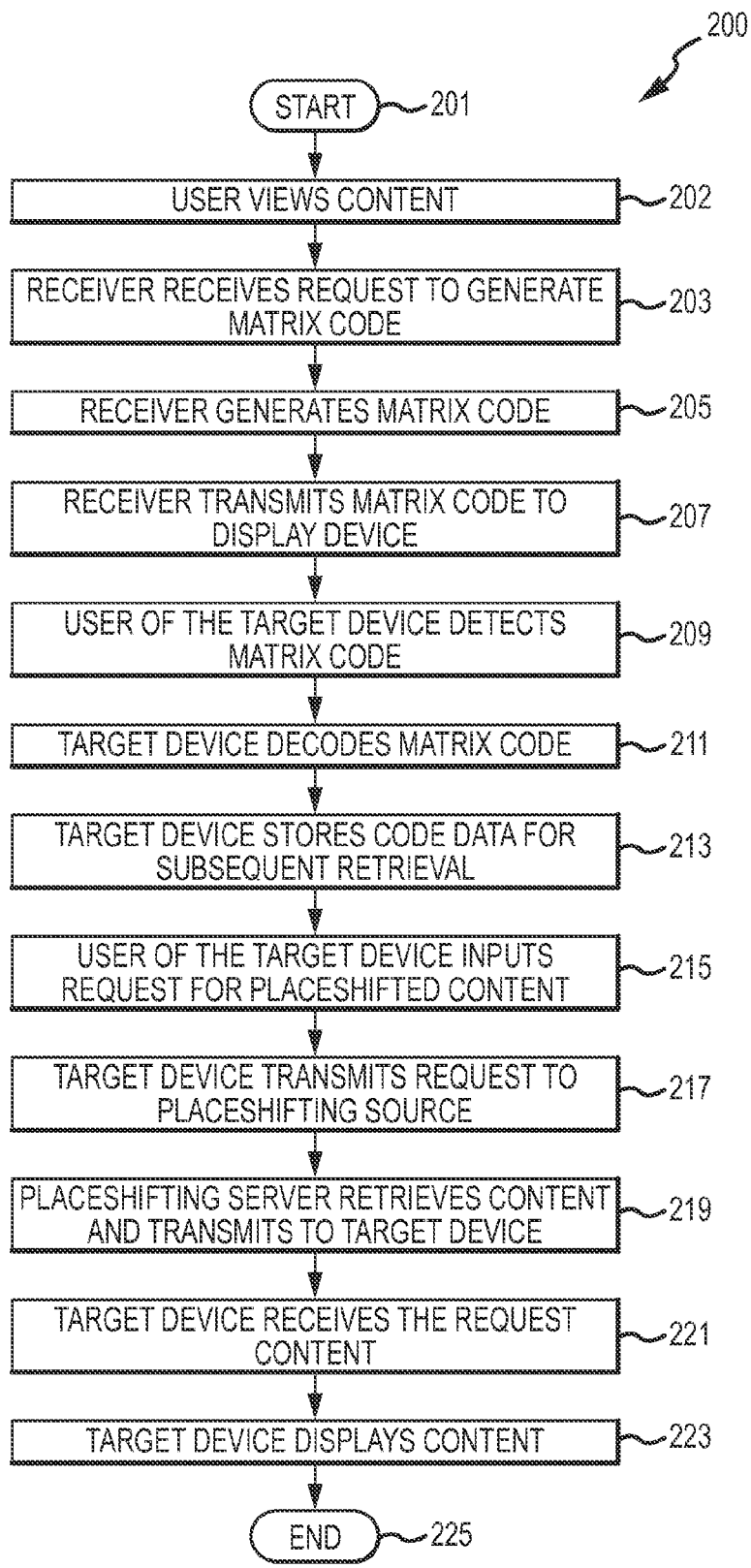
FIG. 2 is a flow chart illustrating a method for facilitating placeshifting transmissions to users of a target device using matrix code in accordance with some embodiments of the present disclosure. This method may be performed by the system of FIG. 1.

FIG. 2 illustrates a method 200 for facilitating placeshifting transmissions to users of a target device using matrix code in accordance with some embodiments of the present disclosure. The method 200 may be performed by the system 100 of FIG. 1. The flow begins at block 201 and may proceed to block 202 where a user views content, such as a television or movie program being transmitted from the receiver 103 to the display device 105. At block 203, the receiver 103 may, at a point prior to completion of the program being viewed by the user, receive a request to generate a matrix code. A user may input the matrix code request, for example, by entering an appropriate command though a user interface of the receiver 103 or target device 109. Alternatively, the receiver 103 may automatically generate matrix codes on a periodic bases. At block 205, the processing unit 113 may generate a matrix code that includes at least information regarding the content being transmitted by the receiver 103 for display to the display device 105. The information regarding the content being transmitted by the receiver 103 may include at least program identifying information (e.g., program name, unique ID) and elapsed time information (e.g., how far into the program a user is). At block 207, the processing unit 113 may transmit the generated matrix code to the display device 105.

At block 209, a user of the target device 109 may employ the optical reading device 131 to detect and/or record the matrix code, which has been made available on the display device 105. At block 211, the processing unit 127 of the target device 101 may decode the matrix code. At block 213, the processing unit 127 may store the code data to the storage media 129 for subsequent retrieval.

At block 215, a user of the target device 109, which at this point may be at a remote location, may input a request for placeshifted content. A user may input the placeshifting request by, for example, entering an appropriate command through a user interface of the target device 109. The commands may include a user making a selection relating to the previously captured matrix code. In so doing, the user may select to receive content that is available at receiver 103, such as content corresponding to the at least partially viewed program of block 202. For example, the selected content may include at least that portion of the program of block 202 that follows the point of the program at which the matrix code of block 203 was requested. Alternatively, the selected content may include any portion of the program of block 202, including the entire program.

At block 217, the placeshifting client 135 of the target device 109 may initiate a network transaction across the network 111 to a placeshifting source. The transaction may include transmission of the placeshifting request to one of the placeshifting servers 125, 141. At block 219, the placeshifting server 125, 141 that receives the placeshift request may retrieve the content corresponding to the placeshift request, and transmit such content in a network transaction across the network 111 to be received by the placeshifting client 135.

At block 221, the placeshifting client 135 may receive the requested content. At block 223, the placeshifting client 135 may output the placeshifted content on the presentation device 133 of the target device 109. For example, the outputted placeshifted content may include the program of block 202, from the point in the program at which the matrix code of block 203 was requested and displayed. Alternatively, the outputted placeshifted content may include the program of block 202 from any point in the program. The flow may then proceed to block 225 and end.

It should be understood that the specific steps as well as the specific order or hierarchy of steps described in method 200 is an example of a sample approach. In other implementations, some of the specific steps as well as the specific order or hierarchy of steps in the method may be rearranged while remaining within the disclosed subject matter.

Figure 3B:
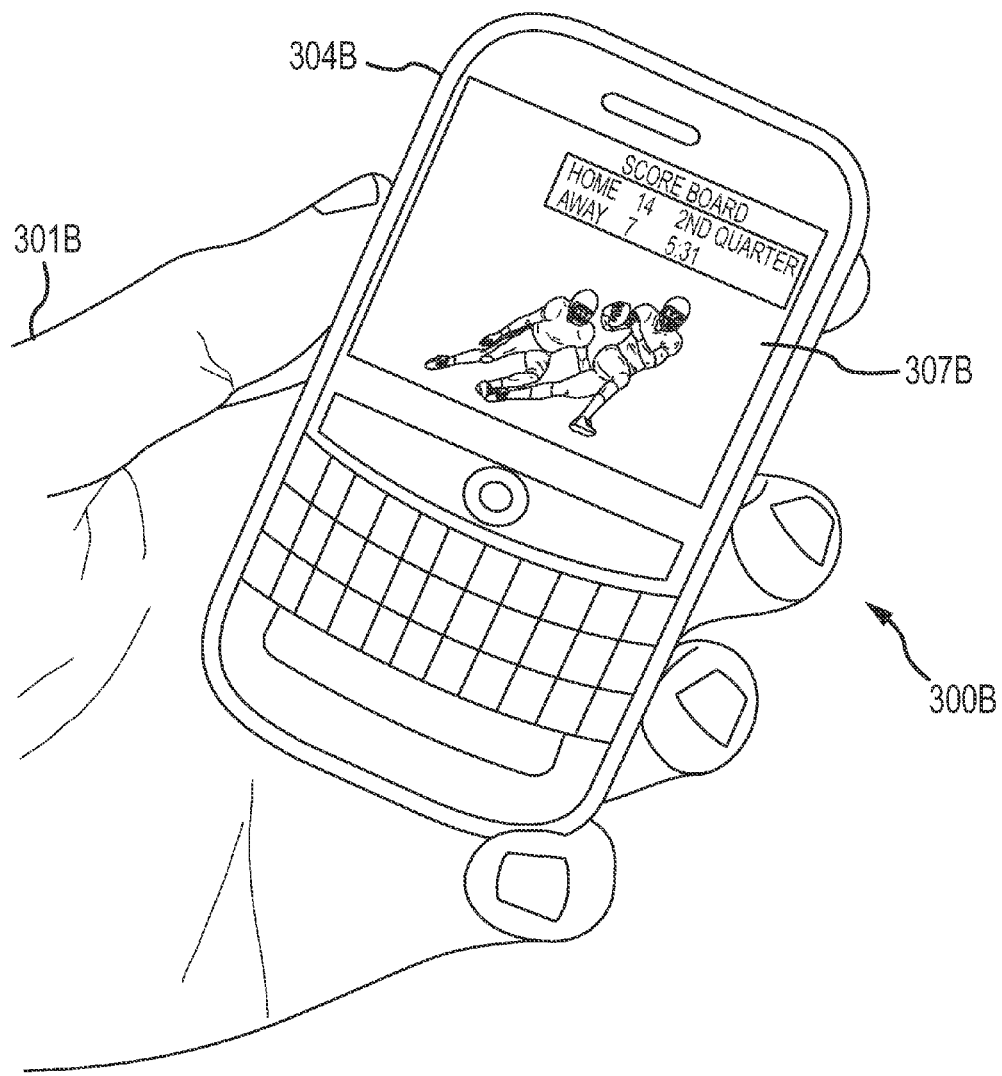

FIGS. 3A-3B illustrate an example system 300A-300B for providing a user 301A-301B of a target device 304A-304B with placeshifted content utilizing matrix code. The system may be the system of FIG. 1. As illustrated in FIG. 3A, a user 301A is viewing a program that is being displayed on a television screen 302A of a television 305A. Also as illustrated, the user 301A possesses a target device 304A which he may utilize to capture one or more matrix codes 306 displayed during the program. In order to receive placeshift transmission of the program, the user 301A takes a picture of the matrix code 306 on the screen 302A of the television 305A with the target device 304A that is executing a matrix code reader program. The matrix code reader program decodes the matrix code and stores the code data. The code data includes information identifying the program and the point in the program that the matrix code was captured. At some later point, when the target device 304B is at a remote location, the user 301B inputs a request for a placeshift transmission of the program at the point in the program that the matrix code was captured. Based on the stored code data, the target device 304B transmits the placeshift request to a placeshift device. The placeshift device retrieves the content corresponding to the placeshift request and transmits this content to the target device 304B. FIG. 3B depicts the placeshift transmission of the program received by the target device 304B and displayed to the user 301B on a display screen 307B.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and/or other suitable storage medium.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A system for transmitting placeshifted content, comprising:
   a television content receiver comprising a first processor, wherein the first processor is provided with computer implemented instructions to:
      receive a content stream from a service provider and transmit the content stream to a presentation device for display to a user, wherein the content stream corresponds to an audio/visual program;
      generate, based at least in part on the content stream and/or data associated with the content stream, a matrix code in response to a first input from the user, wherein data encoded in the matrix code comprises the audio/visual program identifying information and elapsed time information with respect to the audio/visual program; and
      transmit the matrix code to the presentation device and display the matrix code to the user;
   wherein the television content receiver further comprises a recorder communicably coupled to the first processor, and wherein the first processor is provided with further computer implemented instructions to record the audio/visual program upon generation of the matrix code by utilizing the recorder;

a target device communicably coupled to a network, the target device comprising:

an optical input device configured to optically detect the matrix code, and a second processor communicably coupled to the optical input device, wherein the second processor is provided with computer implemented instructions to:

decode the matrix code; and generate, based at least in part on the decoded matrix code and a second user input, a request for the content stream previously transmitted from the service provider to the television content receiver;

wherein the request for the content stream previously transmitted comprises requesting a portion of the audio/visual program commencing from a point in the audio/visual program that corresponds to the point in the audio/visual program when the matrix code was displayed to the user; and a placeshifting device communicably coupled to the network, the placeshifting device comprising a third processor, wherein the third processor is provided with computer implemented instructions to:

receive across the network the target device's request for the content stream previously transmitted from the service provider to the television content receiver;

based at least in part on the request, retrieve from a storage device of the recorder the content stream for transmission over the network to the target device; and display the retrieved content stream at the target device to the user.

2. The system of claim 1, wherein the placeshifting device retrieves the content stream from the storage device that is located within the content receiver.

3. The system of claim 1, wherein the placeshifting device retrieves the content stream from the storage device that is remote from the content receiver.

4. The system of claim 1, wherein the content stream is a television or movie program.

5. The system of claim 1, wherein the matrix code is a QR code.

6. A method for providing a user of a target device with placeshifted content, the method comprising:

receiving, at a television content receiver, a content stream from a service provider and transmit the content stream to a presentation device for display to a user, wherein the content stream corresponds to an audio/visual program;

generating, by the television content receiver, based at least in part on the content stream and/or data associated with the content stream, a matrix code in response to a first input from the user, wherein data encoded in the matrix code comprises the audio/visual program identifying information and elapsed time information with respect to the audio/visual program;

transmitting, by the television content receiver, the matrix code to the presentation device and displaying the matrix code to the user;

wherein the television content receiver further comprises a recorder communicably coupled to the television content receiver, and recording the audio/visual program upon generating the matrix code by utilizing the recorder;

detecting, utilizing the target device, the matrix code optically, generating, by the target device, based at least in part on the matrix code and a second user input, a request for the content stream previously transmitted from the service provider to the television content receiver;

wherein the request for the content stream previously transmitted comprises requesting a portion of the audio/visual program commencing from a point in the audio/visual program that corresponds to the point in the audio/visual program when the matrix code was displayed to the user;

receiving, at a placeshifting device, across the network the target device's request for the content stream previously transmitted from the service provider to the television content receiver;

retrieving, utilizing the placeshifting device, based at least in part on the request, from a storage device of the recorder the content stream for transmission over the network to the target device; and displaying, at the target device, the retrieved content stream to the user.

7. The method of claim 6, wherein the request specifies that the placeshifting device retrieve the content stream from the storage device that is located within the television content receiver.

8. The method of claim 6, wherein the matrix code is indicating a geographical location, and the content stream transmitted by the placeshifting device is retrieved by the placeshifting device from the storage device that is remote with respect to the geographical location.

9. The method of claim 6, wherein the content stream is a television or movie program.

10. The method of claim 6, wherein the matrix code comprises a QR code.

* * * * *